Jan. 23, 1968  C. M. ASCHENBRENNER ET AL  3,364,830
OPTICAL SYSTEM FOR AERIAL CAMERA

Filed July 19, 1965  3 Sheets-Sheet 1

INVENTORS
CLAUS M. ASCHENBRENNER
JOHN T. WATSON
BY
ATTORNEYS

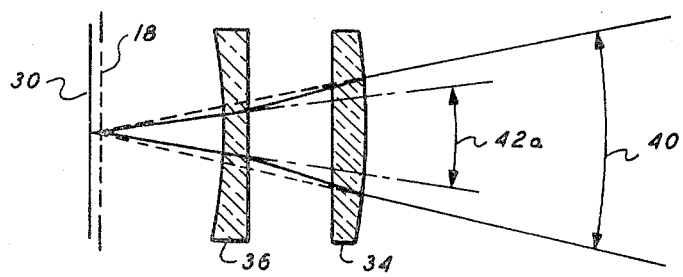
FIG. 2
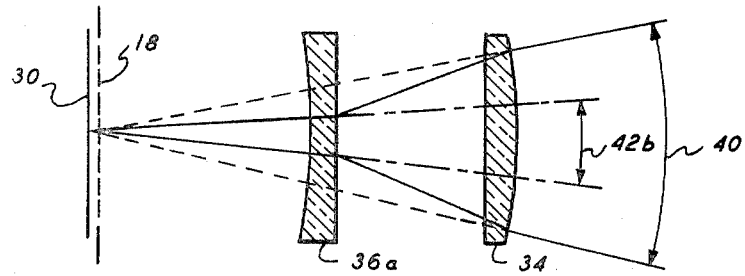
FIG. 3
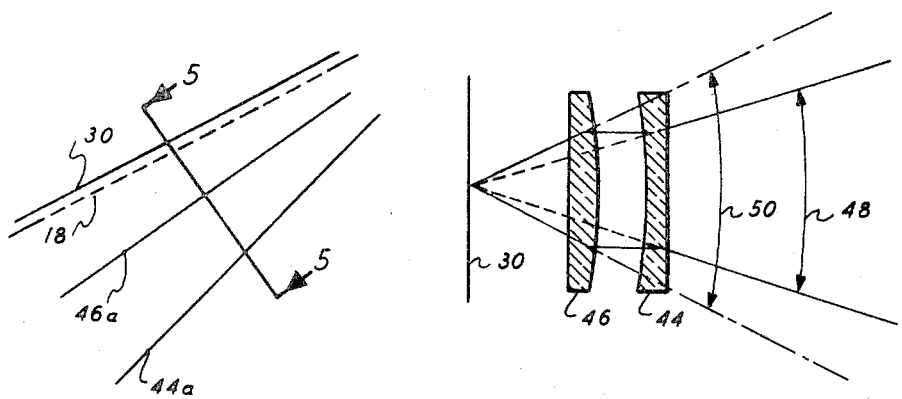
FIG. 4
FIG. 5

United States Patent Office 3,364,830
Patented Jan. 23, 1968

3,364,830
OPTICAL SYSTEM FOR AERIAL CAMERA
Claus M. Aschenbrenner, Lexington, and John T. Watson, Wellesley Hills, Mass., assignors to Itek Corporation, Lexington, Mass., a corporation of Delaware
Filed July 19, 1965, Ser. No. 472,949
11 Claims. (Cl. 95—12.5)

ABSTRACT OF THE DISCLOSURE

A side oblique strip camera is disclosed having a cylindrical lens system for continuously varying the magnification of images along the length of the slit for the purpose of equalizing image velocity in the line of flight.

---

Figure 1:
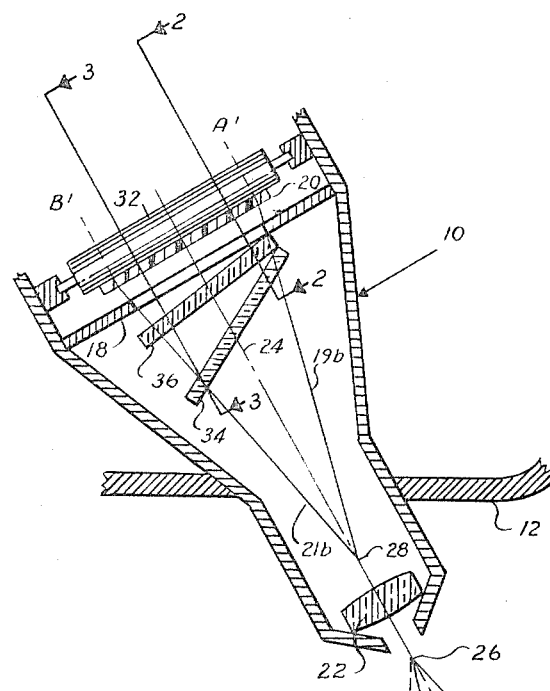

The present invention relates to an optical system and in particular to an optical system for producing non-uniform anamorphic magnification in slit image applications. While the optical system of the present invention has other uses, it is particularly adapted for use in side oblique, continuous strip, aerial camera photography and the invention will be described in terms applicable thereto.

A strip camera accomplishes continuous aerial photography by transporting film in a focal plane behind an exposure slit. The exposure slit has a length across the flight path equal to the width of the film and a width in the order of one millimeter.

An important consideration to the resolution of images on aerial photographs is the problem related to image motion during exposure. Image motion is the movement of the image in an aerial camera during exposure and is in proportion to the ground speed, altitude, focal length, and angle of obliquity. The angle of obliquity is the angle between the camera axis and the nadir. When the camera axis is at the nadir, there is negligible variation in the rate of image motion across the focal plane of the camera for a given speed, altitude and focal length. In side oblique, continuous strip, aerial camera photography, the strip camera is mounted deliberately with the camera axis at a fixed angle of obliquity. One disadvantage in the use of this type of camera in the oblique position is that image motion cannot be compensated completely since the variation in slant range to different points on the ground causes a variation in the image motion from one end of the exposure slit to the other. Images of objects nearer to the horizon move across the focal plane of the camera at a rate of speed which is substantially less than the rate of speed of images of objects located closer to the flight path. Under such conditions, it has been impossible to avoid a variation in sharpness of the image from one edge of the format area to the other end.

It is, therefore, an object of the present invention to provide an improved optical system wherein image motion is uniform in the exposure area for side oblique photography as well as for vertical photography.

Another object of the present invention is to provide an improved optical system that permits high quality, continuous strip photography in the side oblique mode.

A further object is to provide an improved optical system wherein variation in image motion over the slit of the side oblique strip camera is compensated continuously and automatically by optical means.

Another object is to provide an improved optical system wherein image motion is compensated without adding substantially to the weight, volume, and cost of the apparatus.

Another object of the present invention is to provide an improved optical system that is easily maintained.

These and other objects are obtained in accordance with the practice of the present invention by the use of a unique optical system for image motion compensation. Essentially, the optical system of the present invention is comprised of two or more aspheric surfaces; generally a weak positive cylindrical lens and a somewhat stronger negative cylindrical lens. The axes of the lenses are placed in line with the slit but at a slight angle to the focal plane to achieve variable magnification in the direction of image motion. There is negligible effect on the image magnification when the lenses are close to the focal plane but, as the separation between the lenses and their distance from the focal plane increases, the lenses change the convergent cone angle at the camera lens and, hence, the equivalent focal length without changing the focal point, thereby continuously varying the degree of magnification as a function of position, along the slit to in turn correct the aforesaid variation in image motion.

In an illustration of the present invention, a side oblique continuous strip aerial camera has the camera axis at an oblique angle with the nadir to the ground. The strip camera includes an exposure slit with its length perpendicular to the direction of image motion. The strip camera has a camera lens to form an image of an object and film support means placed substantially at the image position. A cylindrical optical system is placed between the camera lens and the film support means to continuously vary the magnification of the scene image transverse to the length of the slit. The magnification varies almost linearly with position along the length of the slit.

Figure 6:
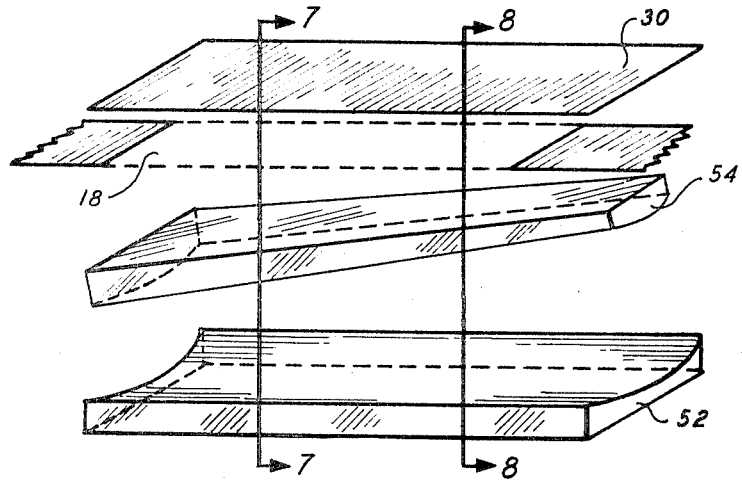
Figure 7:
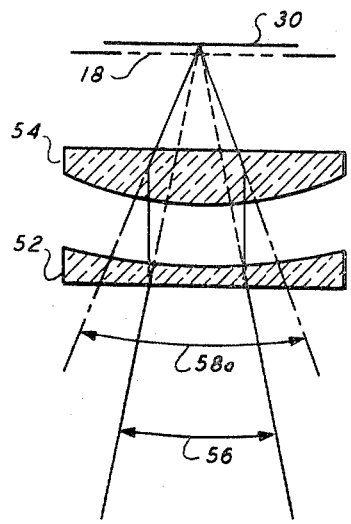
Figure 8:
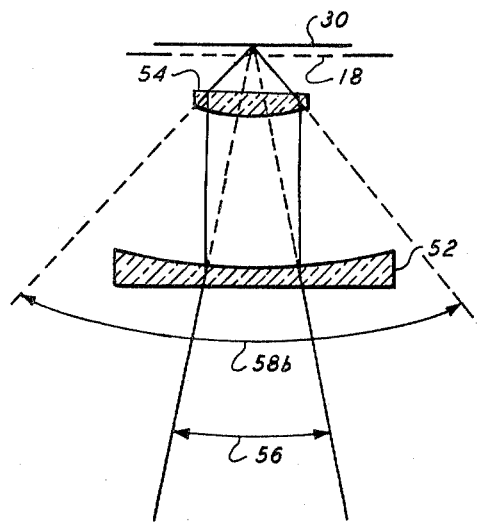

The novel features of the present invention are set forth in the appended claims. Details of the invention, both as to its integration of elements and methods of operation together with further objects and advantages thereof, may be best understood by reference to the following description taken in conjunction with the accompanying drawings: FIGURE 1 is an embodiment of the present invention; FIGURE 2 is a section along line 2—2 of FIGURE 1, and FIGURE 3 is a section along line 3—3 of FIGURE 1; FIGURE 4 is a second embodiment of the present invention and FIGURE 5 is a section along line 5—5 of FIGURE 4; FIGURE 6 is a third embodiment of the present invention; FIGURE 7 is a section along line 7—7 of FIGURE 6, and FIGURE 8 is a section along line 8—8 of FIGURE 6.

The present invention is illustrated in FIGURE 1 embodied in a strip camera shown generally by arrow 10. Camera 10 is mounted to the fuselage of an aircraft 12, the direction of travel of aircraft 12 being perpendicular to the plane of the drawing and towards the observer. Camera 10 is mounted to view an object plane 16 on which is disposed a scene 14. An exposure slit 18 has a length perpendicular to the direction of travel of aircraft 12. Camera lens 22 defines a focal plane and a camera axis 24 which intersects object plane 16 at point C. For diagrammatic purposes, the entrance, or front nodal point, of camera lens 22 is shown at point 26, and the exit, or rear nodal point, is shown at point 28. The projection of exposure slit 18 an object plane 16 lies between ray lines 19a and 21a which intersects object plane 16 at points A and B, respectively. The projection of exposure slit 18 on the film 20 lies between ray lines 19b and 21b which intersect film 20 at points A' and B', respectively. Film 20 moves behind exposure slit 18 in the direction of travel of the aircraft 12. The film driving mechanisms and the film supply systems are typical of those employed in a continuous strip camera and are not illustrated. Typically, but not limited thereto, exposure slit 18 has a width of the order of one millimeter and a length at least equal to the width of film 20.

Film support means are provided to hold film 20 substantially in the focal plane of camera lens 22. The film support means include a roller 32 for guiding the photosensitive surface of film 20 in the focal plane.

Oblique angle $t$ is the angular measure between intersecting nadir line 17 and optical axis 24. The angle of view to $2r$ is a measure of angular separation between intersecting ray lines 19a and 21a. It can be shown that, in the direction of flight, the scale of the image in side oblique strip photography varies linearly with the position along the slit length.

As has been heretofore noted, image motion is minimum at points on the image plane nearest the horizon in the vicinity of point B and is maximum at a point on the image plane away from the horizon nearest the aircraft; for example, point A. It is demonstrable that the required correction, R, in the direction of flight along the exposure slit, that is, between points A' and B' for any particular oblique angle $t$ and for any half view angle $r$, is $$R = (\cot t + \tan r)/(\cot t - \tan r)$$

In accordance with the concepts of the present invention, the required magnification correction over the image plane is achieved optically with a cylinder lens system.

Camera 10 includes an optical correction system disposed between the camera lens system 22 of the imaging means and exposure slit 18. The optical system includes two cylindrical lenses: a first positive lens 34 and a second negative lens 36 interposed between positive lens 34 and exposure slit 18. By usual optical notation, the first lens is the lens nearest to the source of light. As shown in FIGURE 1, the relationship between the focal length, F' of the positive lens 34 and the focal length, F'' of negative lens 36 and the magnification correction ratio, R, can be expressed as $$F''R = -K^2 F'$$

This equation is expressed in terms of a constant K, where K is the ratio of the distance of the negative lens from the focal plane to the distance of the positive lens from the focal plane (along the optical axis). The maximum value of the distance of the positive lens from the focal plane is determined by the physical limitations of the camera. The relationship between the focal length of the negative lens and its distance S'' from the focal plane is $$F'' = -S''(1-K)/(R-1)$$

When lenses 34 and 36 are close to the image plane, lenses 34 and 36 do not appreciably affect or alter the image magnification. As lenses 34 and 36 are positioned further and further away from the image plane, the magnification of the image in the direction of film motion is continuously increased without changing the focus of the images, thereby correcting for the aforesaid variation in the rate of image motion. The variable optical correction system of the present invention thereby achieves variable magnification by modifying the original aperture cone angle.

In FIGURES 2 and 3 there is shown the change in an original aperture cone angle 40 at separated planes along the length of the aperture slit. In FIGURE 2, where lenses 34 and 36 are very close to film 20, the change in aperture cone angle 40 is minimized to modified cone angle 42a. In FIGURE 3, the separation between lenses 34 and 36 and film 20 increases and the modified cone angle decreases as, for example, cone angle 42b. Hence, it can be shown that the focal length changes without changing the focal position and the magnification increases substantially linearly with the separation of the lenses from the focal plane. The scale along exposure slit 18 is varied linearly as the axes of lenses 34 and 36 are placed at a slight angle to the focal plane or the plane of the film 20.

As will be observed by those skilled in the art, the geometric requirements for focus are substantially met by straight cylinders. However, slightly curved cylinders may be required for some applications. This required curvature can be achieved either in manufacture of the cylinder, or, in most cases of interest, by mechanical deformation of thin straight cylinders. Since either practice is available to those skilled in the art and is not a part of the invention, such practices are not described herein.

While the invention heretofore has been described in terms of a first positive cylinder lens and a second negative cylinder lens for linearly increasing magnification, the invention can be used to describe a cylindrical system for linearly decreasing magnification or increasing minification. An embodiment disclosing this aspect is shown in FIGURE 4. A first negative cylinder lens 44 and a second cylinder lens 46 are angularly mounted with their principal planes 44a and 46a. The mounting positions of lenses 44 and 46 with respect to the focal plane and aperture slot 18 are determined from the relationships previously described after appropriate changes in sign are made to reflect linearly decreasing magnification.

It will be seen in FIGURE 5 that the original aperture cone angle 44 is changed to a modified aperture cone angle 50.

A further embodiment of the invention is disclosed in FIGURE 6 for producing nonuniform anamorphic magnification for slit image applications employing a negative cylinder lens 52 and a positive cone lens 54. Negative cylinder lens 52 is placed one focal distance in front of the focal plane and with the principal plane parallel to the focal plane. In this mode, negative cylinder lens 52 reimages the focal plane at infinity. Positive cone lens 54 lies in such a position that its focus is everywhere at the original focal plane. Positive cone lens 54 thus reforms on focal plane 30 the light previously collimated by negative cylinder lens 52. Since the focus of positive cone lens 54 is shorter at the strong end than at the weak end, the image is smaller at the strong end and larger at the weak end.

In FIGURES 7 and 8 the original aperture cone angle 56 is modified to cone angles 58a and 58b, respectively. Thus, the magnification is made to vary linearly from one end of the exposure slit to the other.

While there has been described what is presently considered the preferred embodiments of the present invention, it will be obvious to those skilled in the art that various changes and modifications may be made therein without departing from the inventive concepts and it is aimed in the appended claims to cover all such changes and modifications as fall within the true spirit and scope of the invention.

What is claimed is:

1. In a slit camera having a camera axis for photographing an object plane having a nadir line perpendicular thereto which intersects said camera axis to form an oblique angle therebetween and further including optical means for imaging objects in said object plane at a given focal plane, film support means being disposed in said focal plane and an exposure slit being positioned along said camera axis and having an axis of elongation transverse to said camera axis to define an angle of view for said camera, the improvement wherein said optical means further includes:

means to continuously change the degree of magnification of images of said objects at said focal plane transverse to said axis of elongation by magnitudes which eliminate variations in image velocity of said images projected upon said focal plane.

2. The camera of claim 1 wherein the degree of said change in magnification along said axis of elongation is substantially linear.

3. The camera of claim 1 wherein said degree of change in magnification transverse to said axis of elongation is the function of $(\cot t + \tan r)/(\cot t - \tan r)$, where $t$ is said oblique angle and $r$ is half of said angle of view.

4. The camera of claim 1 wherein said optical means comprises a first aspheric lens having a first aspheric lens axis and a second aspheric lens having a second aspheric lens axis, said first aspheric lens axis and second aspheric lens axis being aligned with said axis of elongation, and said first aspheric lens intersecting said camera axis at a first predetermined angle at a first predetermined distance from said focal plane and said second aspheric lens axis intersecting said camera axis at a second predetermined angle different from said first predetermined angle at a second predetermined distance from said focal plane.

5. The camera of claim 1 wherein said optical means comprises a first cylindrical lens having a first cylindrical lens axis and a second cylindrical lens having a second cylindrical lens axis, said first cylindrical lens axis and second cylindrical lens axis being aligned with said axis of elongation, and said first cylindrical lens intersecting said camera axis at a first predetermined angle at a first predetermined distance from said focal plane and said second cylindrical lens axis intersecting said camera axis at a second predetermined angle different from said first predetermined angle at a second predetermined distance from said focal plane.

6. The camera of claim 5 wherein said first cylindrical lens comprises a convex cylindrical surface and a corresponding opposite planar surface and said second cylindrical lens comprises a concave cylindrical surface and a corresponding opposite planar surface.

7. The camera of claim 6 wherein said concave surface is adjacent said slit and the corresponding planar surface of said second cylindrical lens is in face to face relation with the planar surface of said first cylindrical lens so that said magnification of said images of objects further and further from said nadir increases.

8. The camera of claim 6 wherein said planar surface of said first lens opposite said convex surface is adjacent said slit, and said convex surface of said first lens and said concave surface of said second lens are in face to face relation, so that minification of said images of objects further and further from said nadir decreases.

9. The camera of claim 1 wherein said optical means comprises:

a conical lens having a conical lens axis, a convex surface and an opposite planar surface, a cylindrical lens having a cylindrical lens axis, a concave surface and an opposite planar surface, said conical lens axis and said cylindrical lens axis being aligned with said axis of elongation.

10. The camera of claim 9 wherein said conical lens is adjacent said slit and the convex surface of said conical lens and the concave surface of said cylindrical lens are in face to face relation.

11. The camera of claim 6 wherein said concave surface is adjacent said slit and said corresponding planar surface is in face to face relation with said planar surface opposite said conical surface.

References Cited

UNITED STATES PATENTS 2,899,882  8/1959  Wylie _____ 95—12.5
3,054,854  9/1962  Neasham.

JOHN M. HORAN, *Primary Examiner.*